Ivan B. Johnson
Inventor

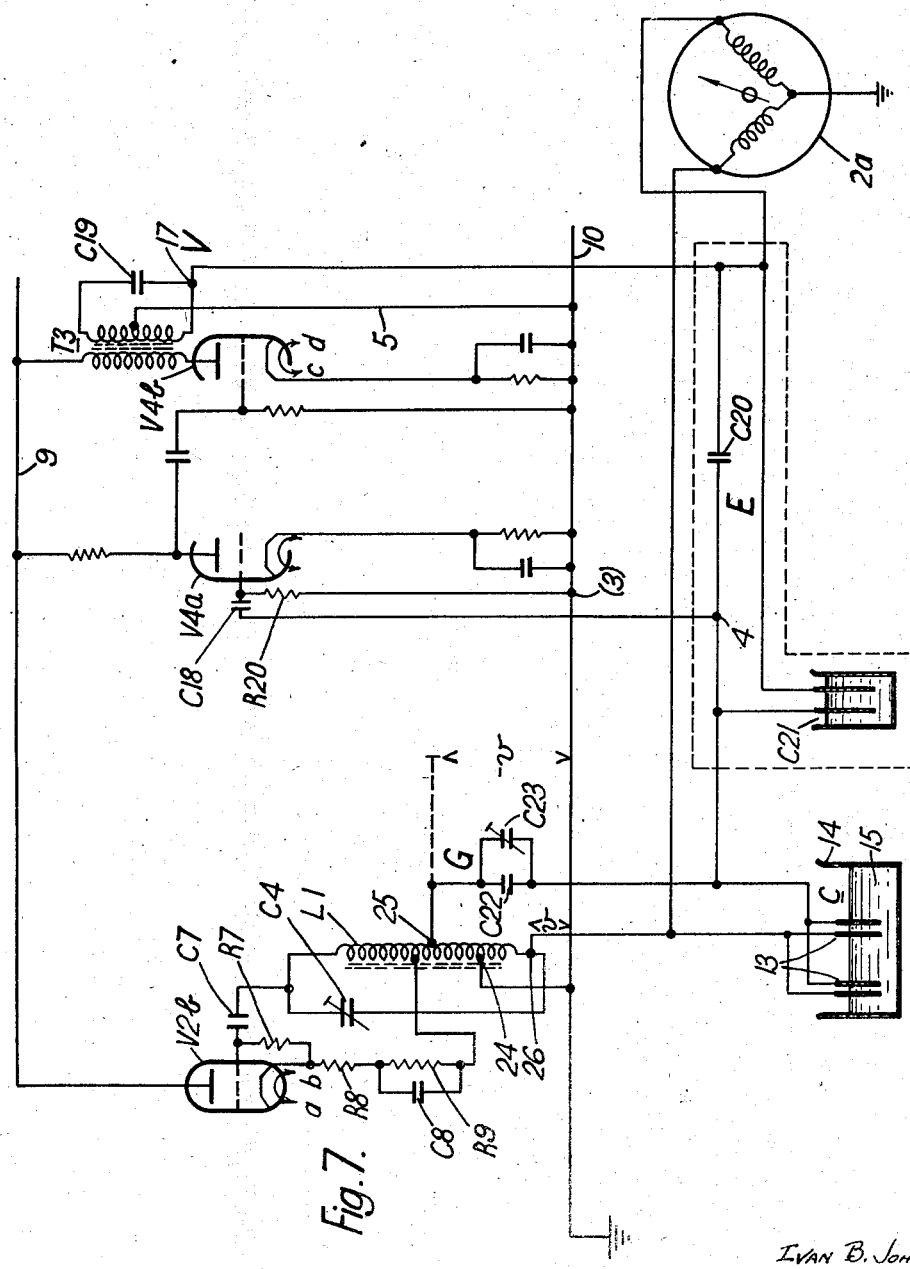

United States Patent Office 2,908,166
Patented Oct. 13, 1959

2,908,166

LIQUID LEVEL INDICATING DEVICES

Ivan Boris Johnson, Guildford, Surrey, England, assignor to Smiths America Corporation, Ruxton, Md.

Application April 1, 1954, Serial No. 420,409

11 Claims. (Cl. 73—304)

The present invention relates to devices for giving an automatic indication of the value of the ratio of two impedances and is particularly applicable to liquid contents gauges of the capacitance type, in which the capacitance of a plurality of capacitors (the tank capacitors) distributed throughout a space to be occupied by a liquid varies substantially linearly with the volume of liquid in said space, so that the ratio of the said capacitance to a standard capacitance provides an indication of the quantity of liquid.

According to the present invention a device for giving an automatic indication of the ratio of first and second impedances of the same kind comprises a high gain amplifier having first and second input terminals, a first A.C. source having first and and second terminals, the first terminal of said source being connected to the first input terminal, the second terminal of said source being connected to the first terminal of the first impedance and the second terminal of the first impedance being connected to the second input terminal, and the second impedance being connected between the amplifier output and input to provide negative feedback, whereby the net input to the amplifier is maintained substantially zero and the amplifier output varies substantially linearly with the ratio of the first and second impedances and provides the requisite indication.

By "impedance of the same kind" we mean impedances which are both capacitative or both inductive.

Means may be provided to stabilise the amplitude of the source, when the amplifier output may be utilised directly to provide the requisite indication. Alternatively, the voltages respectively proportional to the first A.C. source and the amplifier output may be applied to a ratiometer, when the ratiometer will provide the requisite indication.

When applied to a liquid contents gauge of the type referred to one impedance is provided by the tank capacitors and the other is provided by reference capacitor means.

Preferably the reference capacitor means comprise one part whose dielectric is constituted by a representative sample of the liquid to be gauged, whereby the indication provided is compensated for the effects of varying dielectric constant. Conveniently in such a device the capacitance of the reference capacitor means may be dependent upon the density of the liquid to be gauged, whereby the device is also compensated for the effects of varying liquid density.

Alternatively, when the device is required for use with a range of liquids such that there is a functional relationship between their density and dielectric constant, the reference capacitor means comprise a capacitor whose dielectric is constituted by a sample of liquid in parallel with a fixed capacitor, said capacitors being such that variation in capacitance of said capacitor means approximates to the requirements of the functional relationship for values of the dielectric constant in the region of a typical value thereof whereby the device is substantially compensated for the effects of density and dielectric constant for liquids of said range.

Embodiments of the invention, in which it is applied to liquid contents gauges of the kind referred to will now be described and discussed with reference to the accompanying drawings, of which—

Figure 7 shows a circuit diagram of the second preferred embodiment.

Figure 1:
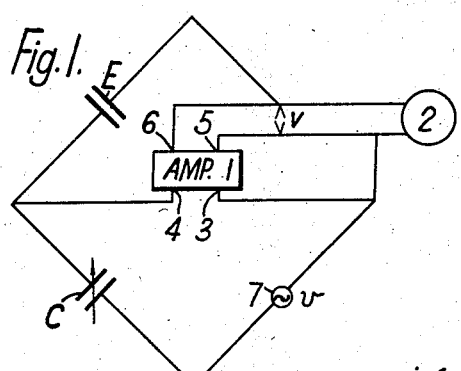
Figure 1 shows a basic circuit from which the various embodiments are derived.

Referring to Figure 1, a high gain amplifier 1 has first and second input terminals 3 and 4 and first and second output terminals 5 and 6. An A.C. source 7 of amplitude $v$ and frequency $$\frac{\omega}{2\pi}$$

has one terminal connected to terminal 3, while its other terminal is connected to one terminal of variable capacitance C, provided by the tank capacitors. The other terminal of C is connected to terminal 4, standard capacitance E is connected between terminals 6 and 4, while terminals 5 and 6 are connected to an indicating meter 2. Terminals 5 and 3 are connected together. The sense of the amplifier output is such that the feed-back through E is negative.

In the usual way the system attains a condition in which the input to amplifier 1 is substantially zero. It is obvious that, in this condition, $$C = \frac{V}{v} \cdot E$$

where V is the magnitude of the amplifier output voltage, i.e. the amplifier output voltage is proportional to C, and the factor of proportionality is determined by E.

This arrangement as it stands is not of great practical use, as it does not enable the effects of stray capacitances to be removed.

Figure 2:
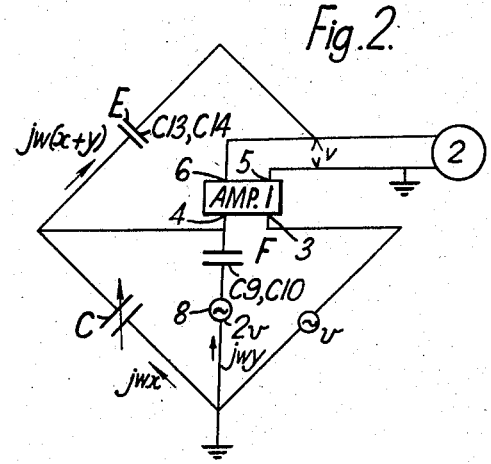
Figure 2 shows a block diagram of a first preferred embodiment, particularly useful when one side of the tank capacitors is grounded.

Referring now to Figure 2, the arrangement there shown enables the effect of stray capacitances to be removed, and also is practically convenient in that it enables one side of C and one output terminal of the amplifier to be grounded. In this figure (and in succeeding ones) components equivalent to those in Figure 1 are indicated by the same numeral. Terminals 3 and 5 are not connected together, and terminal 5 is grounded, as is the side of C remote from terminal 4. A further source 8, of amplitude $2v$ and in phase with 7, has one terminal grounded and its other terminal connected through a further standard capacitance F to terminal 4.

The operation of this arrangement may be considered as follows:

Suppose $q$ is the volume of liquid, K is the dielectric constant of the liquid, $j\omega x$ is the current in the tank capacitors, $j\omega y$ is the current in the second standard capacitance (F). Then $C = a + b(K-1)q$ where $a$ and $b$ are constants and we have, by obvious application of Kirchoff's laws:

$$\frac{x}{C} = v$$

$$\frac{y}{F} = -v$$

$$\frac{x+y}{E} = V - v$$

so $$v(a+b(K-1)q)-vF=(V-v)E$$

and $$v.b.(K-1)q+v(E+a-F)=V.E.$$

If we choose F so that $F=a+E$ we have $$(K-1)q=\frac{E}{v.b}V$$

i.e. the output voltage is proportional to the liquid volume.

Figure 3:
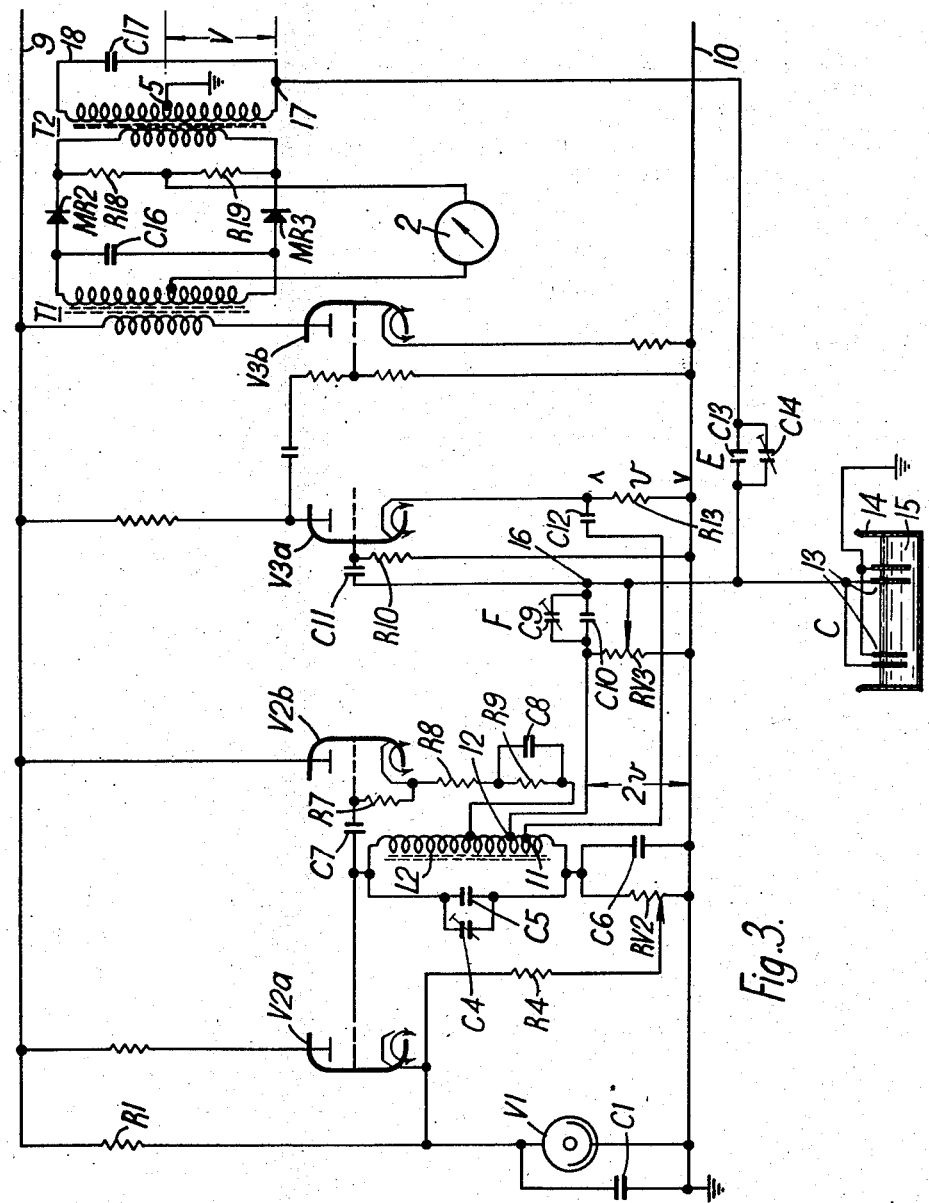
Figure 3 shows a circuit diagram of the first preferred embodiment.

Referring now to the circuit diagram of Figure 3, the device obtains its D.C. power supply from lines 9 (positive) and 10 (earth). A triode valve V2b is connected in a conventional Hartley oscillator circuit, the frequency-determining components being capacitors C4 and C5 and tapped inductor L2, giving a frequency of about 50 kc./s. C7 and R7 indicate the conventional grid condenser and leak, while cathode bias is provided by resistors R8 and R9 and capacitor C8. The cathode current returns to ground via potentiometer RV2, this being by-passed by capacitor C6. A first terminal of L2 is connected to the grid of valve V2a. The cathode of valve V2a is returned to earth via a neon stabiliser V1, which is by-passed by capacitor C1 and whose non-grounded terminal is connected to line 9 through resistor R1. The cathode of V2a is connected through a resistor R4 to the slider of RV2. Thus the amplitude of oscillations across L2 will be such as just to drive the grid of valve V2a positive with respect to the cathode. The voltage at the second terminal of L2 will depend upon the setting of RV2, so this will provide an adjustment of the amplitude of oscillation.

L2 is provided with two taps 11 and 12 between its centre-tap and second terminal. The number of turns between 11 and the second terminal is equal to half that between 12 and the second terminal. Taps 11 and 12 constitute respectively the non-grounded terminals of the sources 7 and 8 of Figure 2.

Tap 11 is connected through a coupling capacitor C12 to the cathode of a triode valve V3a, the cathode being returned to line 10 through resistor R13. Tap 12 is connected through parallel capacitors C9 (having a preset adjustment) and C10 in series with capacitor C11 to the grid of V3a, this being returned to line 10 through resistor R10. Tap 12 is also connected to ground through a pre-set potentiometer RV3 whose slider is connected to the junction of C10 and C11 (16) a full stop C9 and C11 provide capacitance F of Figure 2, and the cathode and grid of V3a correspond respectively to terminals 3 and 4 of Figure 2. Junction 16 is also connected to the non-grounded terminals of the tank capacitors, indicated at 13, disposed in a tank 14 containing a quantity of liquid 15.

Valve V3a is otherwise connected as a conventional amplifier, its output passing to a second triode V3b. The anode load of V3b is constituted by the primary of a transformer T1 whose secondary is centre-tapped, and tuned to resonance by a capacitor C16. The end terminals of the secondary of T1 are connected through similar rectifiers MR2, MR3, to the primary winding of a further transformer T2. Equal resistors R18, R19 are connected across the primary of T2, and a milliammeter 2 is connected between their junction and the centre-tap of the secondary of T1. The secondary of T2 is centre-tapped to earth, and tuned by capacitor C17. One extreme terminal, 17, of the secondary of T2 is connected through fixed capacitor C13, and preset adjustable capacitor C14 to point 16, this terminal being that which provides negative feed-back for the amplifier constituted by V3a, V3b etc. The other extreme terminal, 18, is not used in this embodiment. The voltage between 17 and ground is thus V, and the reading of meter 2 will be proportional to it. It will be seen that C13 and C14 provide the capacitance E of Figure 2.

The manner in which the circuit operates will be obvious from comparison with Figure 2. It will be seen that C9 (affecting F) is adjusted to ensure that the reading of meter 2 is correctly zeroed, while C14 (affecting E) is adjusted to ensure that the scale of meter 2 bears the appropriate relationship to the quantity of liquid.

While it has been stated that the source 8 has magnitude $2v$, it will be appreciated that it may have any convenient value, different values necessitating different values of F.

The purpose of RV3 is to provide a small correction of the phase of the voltage at point 16, necessitated by the relatively poor power factor of the tank capacitance.

Figure 4:
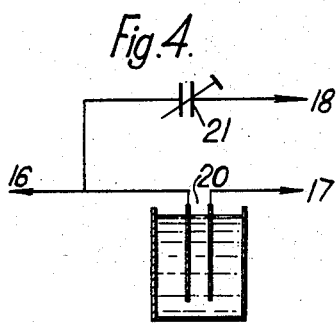
Figure 4 shows a modification of the first preferred embodiment.

Figure 4 shows one way in which the circuit of Figure 3 may be modified to compensate for the effects of variation in dielectric constant of the liquid. C13 and C14 are replaced by a capacitor 20 whose dielectric is constituted by a representative sample of the liquid 15, while a trimming capacitor 21 is connected between point 18 and point 16. It will be seen that the feed-back provided through 21 is positive. The capacitance of 20 is of the form $g+h(K-1)$ where $g$ and $h$ are constants, $g$ being the value of the capacitance of 20 when the liquid is removed plus stray capacitances and $h$ being a constant dependent upon the geometry of 20. 21 is adjusted so that the positive feed-back through it cancels the negative feed-back through capacitance $g$. The effect is thus effectively to make E (of Figure 2) equal to $h(K-1)$, and the value V (and reading of meter 2) will vary linearly with $q$ irrespective of the value of K.

Figure 5:
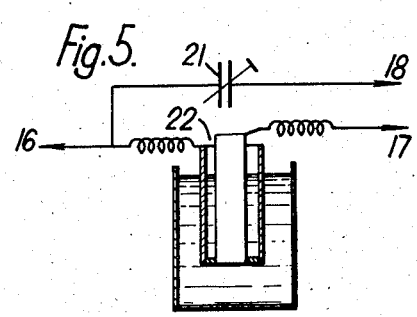
Figure 5 shows a further modification of the first preferred embodiment.

A further modification is shown in Figure 5. This is somewhat similar to the arrangement of Figure 4, except that capacitor 20 is replaced by a floating reference condenser such as is disclosed in British specification No. 673,988. The expression for E then becomes $$E=m+\frac{n(K-1)}{\rho}$$

where $m$ and $n$ are constants and $\rho$ is the density of the liquid. By suitable adjustment V can be made to vary linearly with $\rho q$, i.e. with the mass of liquid.

Figure 6:
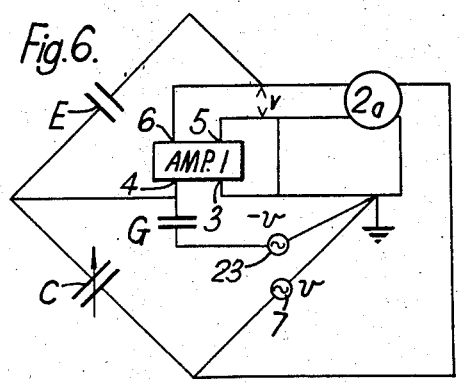
Figure 6 shows a block diagram of a second preferred embodiment.

Referring now to Figure 6 (showing a block diagram of the second preferred embodiment), certain of the components there shown correspond precisely with components indicated by corresponding numbers or letters in Figure 1. However, indicator 2 of Figure 1 is replaced by a ratiometer indicated at 2a in Figure 6, to which are applied the amplifier output V and the voltage source 7, $v$. A further source 23, of the same amplitude as source 7 and in anti-phase therewith is connected between ground and terminal 4 through a capacitance G. As mentioned earlier C is of the form $$a+b(K-1)q,$$

and G is adjusted so that it is equal to a, i.e. G is adjusted so that the feed through it to terminal 4 counteracts the feed through the "empty" capacitance of the tank capacitors and the associated strays. Thus we shall have $$b(K-1)q=\frac{V.E}{v}$$

It frequently happens that, when a number of generally similar liquids are dealt with (for example, aircraft engine fuels) their dielectric constant and density are closely related by an empirical formula of the form $K=r\rho+s$ where $r$ and $s$ are constants.

Thus if, in such a case, capacitance E can be so chosen to be proportional to $$\frac{(K-1)\cdot r}{K-s}$$

V/v will be proportional to $\rho q$, i.e. to the mass of liquid (within the limits of accuracy of the formula). An approximation to this law of variation may be obtained by utilising, to provide E, an air-dielectric capacitor in parallel with a capacitor whose dielectric is constituted by a representative sample of the liquid. Such an arrangement has a capacitance $t+uK$, where $t$ and $u$ are constants, and if $t$ and $u$ are so chosen that $$t+uK=H\left(\frac{K_0-1}{K_0-s}+(K-K_0)\frac{d}{dK}\left(\frac{K-1}{K-s}\right)_{K=K_0}\right)$$

where H is some constant and $K_0$ is an average value of K, the required law of variation will be met to a good approximation, that is $t$ and $u$ must be made, by suitable choice of the two capacitors, such that their ratio is equal to $$\frac{\frac{K_0-1}{K_0-s}-K_0\frac{d}{dK}\left(\frac{K-1}{K-s}\right)_{K=K_0}}{\frac{d}{dK}\left(\frac{K-1}{K-s}\right)_{K=K_0}}$$

It will be seen that this amounts to the replacement of the expression $$\frac{K-1}{K-s}$$

by an expression which is equal to it when $K=K_0$, varies linearly with K and has a rate of variation with K equal to that of $$\frac{K-1}{K-s}$$

when $K=K_0$.

Referring now to the circuit of Figure 7 components there designated by numbers and letters as components in earlier figures are equivalent to them.

V2b is connected in a circuit similar to that of Figure 2, except that an intermediate tapping, 24, of inductor L1, is grounded. The terminal 26 of L1 remote from V2b grid consitutes the non-grounded terminal of source 7, and a further tapping 25, such that the voltage thereat is equal in magnitude and opposite in phase to that at 26, constitutes the non-grounded terminal of source 23. 26 is connected to one side of the tank capacitors 13 while the other side of the tank capacitors 13 is connected, via a coupling condenser C18 and grid leak R20 to the grid of triode V4a. The junction of the tank capacitors and C18 is thus point 4. V4a is connected in a conventional amplifier circuit and its output is fed to triode V4b which is similarly connected. The anode load of V4b is the primary of a transformer T3, having a centre-tapped secondary, the centre tap being grounded. The secondary is tuned by a capacitor C19. One secondary terminal point 17 is connected to point 4 via a fixed capacitor C20 and a capacitor C21, filled with a representative sample of the liquid in tank 14. These are designed to fulfill the conditions set out above, and provide capacitance E. Terminal 17 is also connected to one winding of an A.C. ratiometer 2a whose other winding is connected to tapping 25. A fixed capacitor C22 and preset variable capacitor C23 are connected in parallel between tapping 25 and point 4. These provide capacitance G.

The manner in which the device operates will be immediately obvious from the earlier description with reference to Figure 6. C23 is of course adjusted to cancel out the effect of the empty tank capacitors and the associated strays. It will be clear to those skilled in the art that source 23 need not necessarily be equal in magnitude to source 7. If it is not, capacitance G will not be equal to the empty tank capacitance.

It will be appreciated that the reference capacitors (providing capacitance E) described with reference to either preferred embodiment may be used in the other with appropriate modifications which will be obvious in the light of the description. Also the amplitude-stabiliser circuit of the first circuit could be omitted and a ratiometer indicator used, or an amplitude-stabiliser circuit could be incorporated in the second embodiment and a straightforward meter used in place of a ratiometer as the indicator.

It will also be appreciated that, in all of the embodiments, the reference and standard capacitors may be interchanged, with consequential alterations to the remainder of the circuit which will be obvious in the light of the earlier description. Such arrangements will not be quite so convenient as those described, however, if a straightforward meter is used as indicator, as then the reading will be inversely proportional to liquid contents.

It will be seen that, by the use of devices in accordance with the invention, automatic impedance indicators are provided which do not require any mechanical moving components, in distinction from various prior proposals entailing the use of a servo motor and a standard impedance such as a potentiometer, actuated thereby.

I claim:

1. A device for giving an automatic indication of the ratio of first and second impedances of the same kind comprising a high gain amplifier having first and second input terminals, a first A.C. source having first and second terminals, the first terminal of said source being connected to the first input terminal, the second terminal of said source being connected to the first terminal of the first impedance and the second terminal of the first impedance being connected to the second input terminal, and the second impedance being connected between the amplifier output and input to provide negative feed-back, whereby the net input to the amplifier is maintained substantially zero and the amplifier output varies substantially linearly with the ratio of the first and second impedances and indicator means responsive to the amplifier output, the said indicator means providing the requisite indication.

2. A device as claimed in claim 1, together with means to stabilise the amplitude of the A.C. source, and the indicator means provides an indication proportional to the amplifier output.

3. A device as claimed in claim 1, wherein the indicator means is a ratiometer, means to apply to the terminals of said ratiometer voltages proportional respectively to the amplitude of the first source and the amplitude of the amplifier output, whereby it provides the requisite indication.

4. A device as claimed in claim 1 wherein one impedance is provided by the tank capacitors in a liquid contents gauge of the type referred to and the other is provided by reference capacitor means.

5. A device as claimed in claim 4 wherein the reference capacitor means comprise one part whose dielectric is constituted by a representative sample of the liquid to be gauged, whereby the indication provided is compensated for the effects of varying dielectric constant.

6. A device as claimed in claim 5 wherein the capacitance of the reference capacitor means is dependent upon the density of the liquid to be gauged whereby the device is also compensated for the effects of varying liquid density.

7. A device as claimed in claim 4 for use with a range of liquids such that there is a functional relationship between their density and dielectric constant wherein the reference capacitor means comprise a capacitor whose dielectric is constituted by a representative sample of liquid in parallel with a fixed capacitor, said capacitors being such that variations in capacitance of said reference capacitor means approximates to the requirements of the functional relationship for values of the dielectric constant in the region of a typical value thereof, whereby the device is substantially compensated for the effects of density and dielectric constant for liquids of said range.

8. A device as claimed in claim 4 wherein the first impedance is provided by the tank capacitors and the second impedance by the reference capacitor means.

9. A device as claimed in claim 8 wherein the amplifier has two output terminals the amplifier output being developed as a voltage between said terminals, the first terminal of the reference capacitor means is connected to the second amplifier input terminal, the second terminal of said reference capacitor means is connected to one amplifier output terminal, the second amplifier output terminal is connected to the second terminal of the first source, and a second source, of the same frequency and phase, having an amplitude greater than the first source by a fixed multiple thereof, is connected in series with a further standard capacitor between the second terminal of the first source and the second amplifier input terminal, said further standard capacitor serving to determine the zero of the indication provided.

10. A device as claimed in claim 9 wherein the amplifier has, also a third output terminal, the output voltage between which third terminal and the second terminal being in antiphase with the voltage between the first and second terminals, comprising also a trimming capacitor connected between said third terminal and the second amplifier input terminal, whereby unwanted negative feed-back through the reference capacitor means may be neutralised.

11. A device as claimed in claim 8 wherein the amplifier has two output terminals the amplifier output being developed as a voltage between said terminals, the first terminal of the reference capacitor means is connected to the second amplifier input terminal, the second terminal of said reference capacitor means is connected to one amplifier output terminal, the other output terminal is connected to the first input terminal and a second source, of the same frequency as the first source, of an amplitude which is a constant multiple of that of the first source, connected in series with a further standard capacitor between the first and second input terminals, whereby the effect of "empty" tank capacitance may be neutralised.

References Cited in the file of this patent
UNITED STATES PATENTS

| | | |
|---|---|---|
| 2,377,275 | Smith | May 29, 1945 |
| 2,560,709 | Woodward | July 17, 1951 |
| 2,581,085 | Edelman | Jan. 1, 1952 |
| 2,621,517 | Sontheimer | Dec. 16, 1952 |
| 2,623,929 | Moody et al. | Dec. 30, 1952 |
| 2,629,006 | Oliver | Feb. 17, 1953 |
| 2,710,541 | Miller | June 14, 1955 |
| 2,724,273 | Sontheimer | Nov. 22, 1955 |
| 2,728,035 | Meredith | Dec. 20, 1955 |
| 2,737,808 | Moss | Mar. 13, 1956 |
| 2,738,673 | Campani | Mar. 20, 1956 |